Oct. 27, 1931.  J. J. CHARDELL ET AL  1,828,924
COMBINED SPOTLIGHT AND OBSERVATION DEVICE
Filed March 1, 1927  3 Sheets-Sheet 2
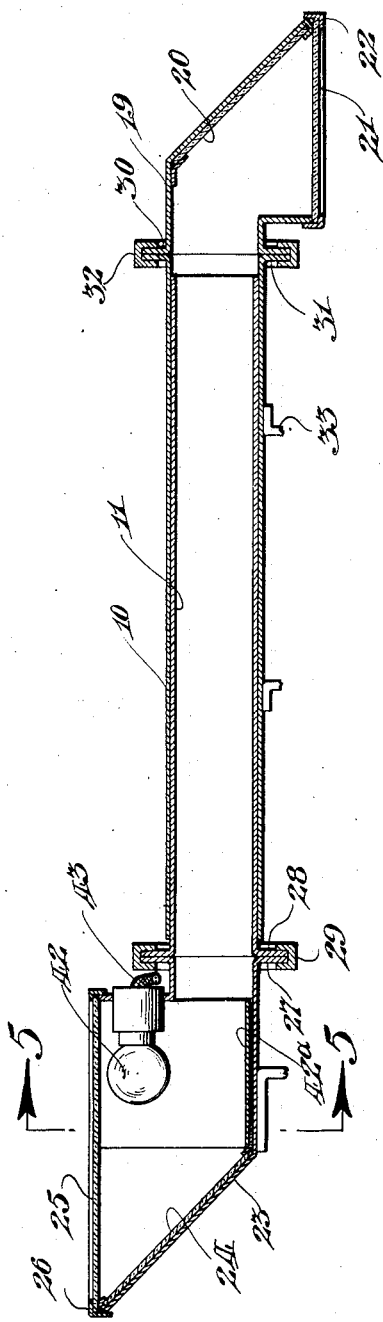
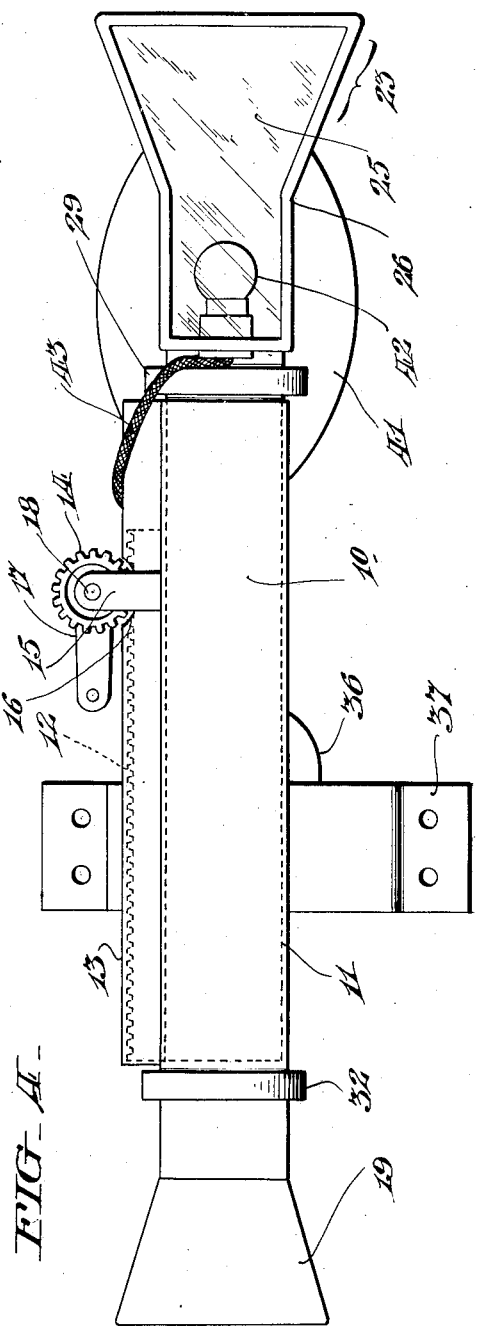
WITNESSES:
INVENTORS:
James J. Chardell &
Louis J. Ferdinand,
BY
ATTORNEY.

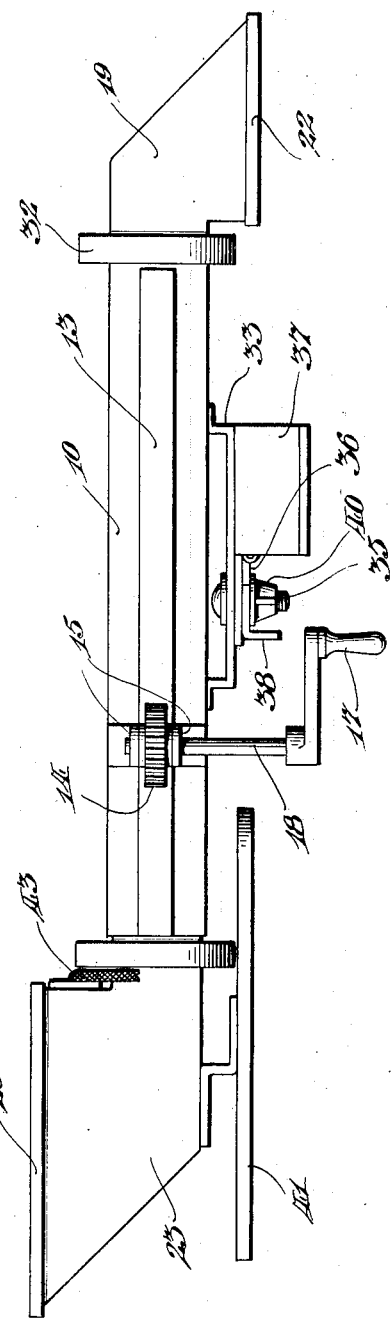
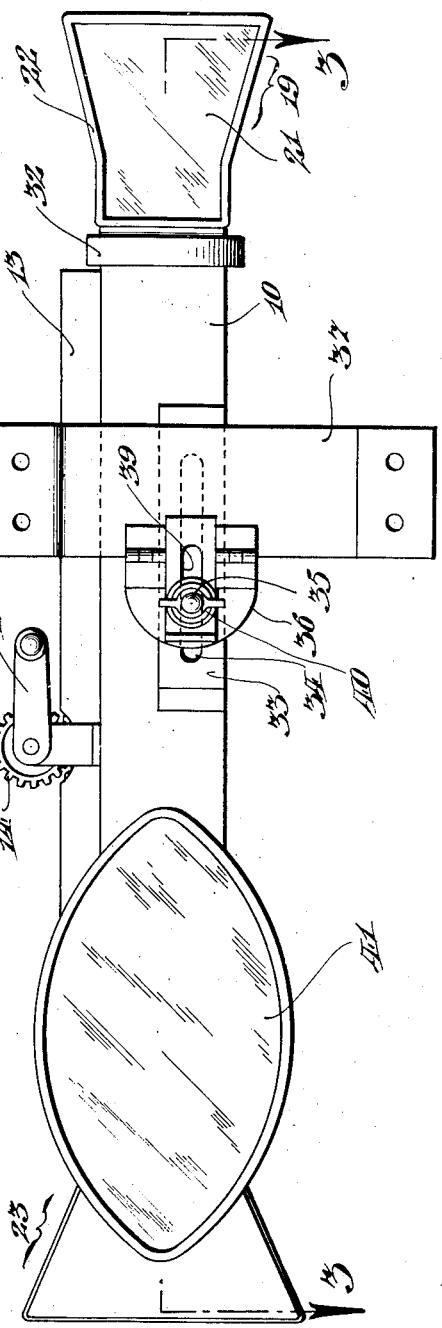

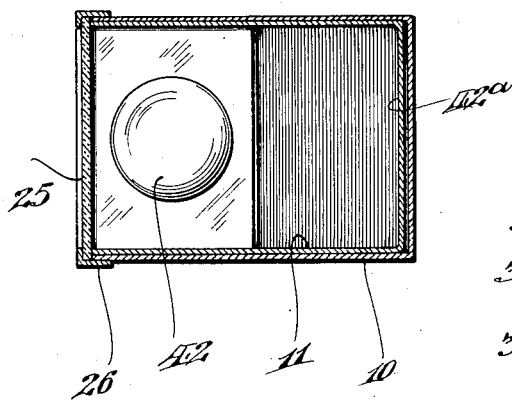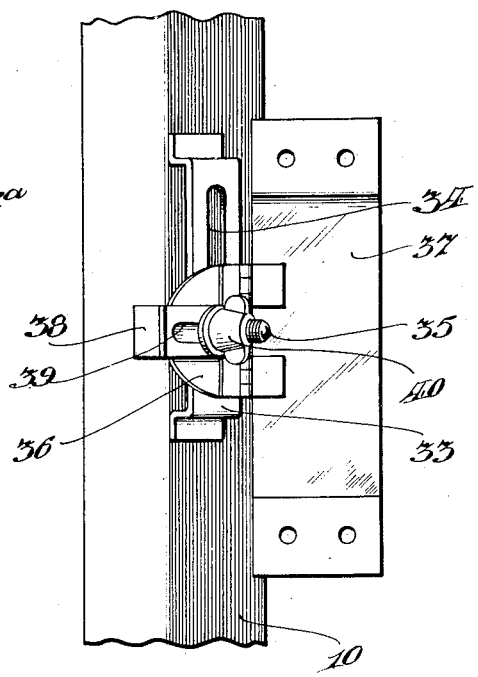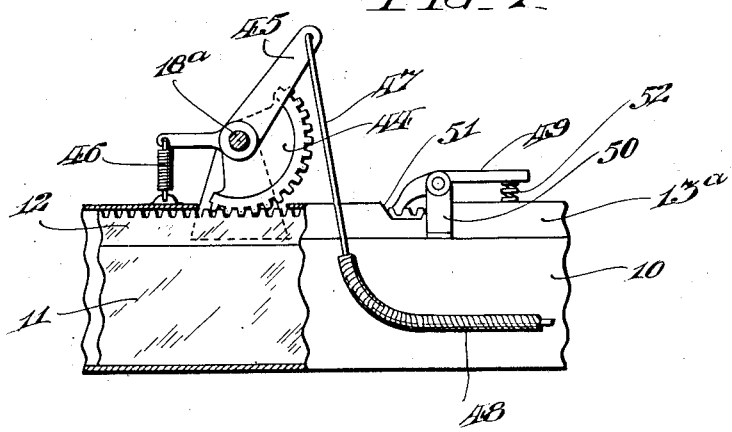

Patented Oct. 27, 1931

1,828,924

UNITED STATES PATENT OFFICE

JAMES J. CHARDELL AND LOUIS J. FERDINAND, OF HAZLETON, PENNSYLVANIA

COMBINATION SPOTLIGHT AND OBSERVATION DEVICE

Application filed March 1, 1927. Serial No. 171,847.

Our invention relates to observation devices and more particularly to a combination observation device and spotlight for use on motor vehicles.

Under the present traffic conditions, it is usually dangerous for the driver of a vehicle to attempt to pass another vehicle before obtaining a view ahead of same. This is especially true if the vehicle ahead happens to be a wide bodied truck.

One of the objects of our invention is to provide a device whereby the driver of a vehicle may obtain a view of the road ahead of another vehicle which he desires to pass without having to leave the right hand side of the road.

Before attempting to pass a vehicle on the road, it is not only advantageous to view the road ahead of such vehicle but also to take note of the traffic conditions behind the driver's car so as to avoid any danger of collision.

Another object of our invention is to provide means whereby the driver of a vehicle can view traffic conditions behind his car as well as the traffic conditions ahead of the car which he desires to pass.

In backing a car after dark, it is highly advantageous to have the ground at the rear of the car illuminated, and still another object of our invention is to provide means whereby such illumination may be provided.

Still another object of our invention is to provide a device which is capable of enabling the driver of a vehicle to look in any direction, regardless of traffic conditions, and to provide a spotlight in such a device, the light from which may be thrown in any direction.

These objects are accomplished by providing a plurality of telescoping tubes constituting a periscope together with means for lengthening and shortening the periscope and means for adjustably securing the tubes to a support for universal pivotal movement, together with means for permitting relative sliding movement between the support and the tubes.

The universal pivotal movement may be accomplished by providing a hinge and a pivoted connection between the support and the tubes and the sliding movement may be effected by adjustably mounting the pivoting member in a slotted member on one of the relatively sliding members referred to.

The adjustment between the telescoping sections may be effected by a rack and pinion connection, together with operating mechanism therefor. The ends of the periscope as constructed above may be swiveled and may be provided with mirrors for reflecting images one upon the other and into the line of vision of the driver of an automobile or other vehicle or device to which the periscopic apparatus may be attached.

In the drawings:—

Figure 1 is a top plan view of an embodiment of our invention,

Figure 2 a rear elevation of same,

Figure 3 a longitudinal sectional view taken on line 3—3 on Figure 2, certain parts being omitted, Figure 4 a front elevation of the device shown in Figure 1, and Figure 5 a cross sectional view, taken on line 5—5 on Figure 3.

Figure 6 is a fragmentary perspective view, showing the device in a vertical position and swung at an angle to its support.

Figure 7 is a fragmentary view, partly in section, showing another method of operating the device.

Referring now more in detail to the drawings, the body of the device consists of an outer tube 10 within which is telescoped an inner tube 11. The tubes may be of any desired shape but we have illustrated them as being rectangular in cross section and have shown a rack 12 mounted on one side of the inner tube and being enclosed by a housing 13 secured to, or formed integral with, outer tube 10. A gear 14 is rotatably mounted between bearings 15 and extends through an opening 16 in housing 13 so that it may mesh with rack 12. Gear 14 may be actuated in any desired manner, as by a handle 17 secured to the shaft 18 on which gear 14 is fixed, and it is evident that rotation of gear 14 will move rack 12 relatively to gear 14 and consequently cause tube 11 to move relatively to tube 10.

An extension 19 is mounted on one end of tube 10 and has a mirror 20 mounted therein at an angle to the center line of the tubes. In order to prevent dirt and moisture from collecting on mirror 20 and on the interior of the tubes, we provide a glass 21 which covers the opening in extension 19 and which is held in place by a suitable cap 22.

An extension 23 is attached to the opposite end of the tube 11 and has a mirror 24 mounted therein and disposed at the same angle to the center line of the tubes as is mirror 20. It is therefore evident that any objects within the range of the opening in extension 23 will be reflected by mirror 24 into mirror 20 and will be visible therein. In order to prevent dirt and moisture from entering extension 23, we cover the opening thereto with a glass 25 which is held in place by a suitable cap 26.

Extensions 19 and 23 are preferably attached to the telescoping tubes in such a manner that they may be swiveled thereon in order to increase the usefulness of the instrument. This object may be attained in various ways but, for the purpose of illustration, we have shown a flange 27 formed on extension 23 and a similar flange 28 formed on the end of tube 11 and abutting flange 27. The flanged ring 29 encircles flanges 27 and 28, holding them in fixed relation to one another but allowing extension 23 to swivel easily on tube 11. Extension 19 is similarly provided with a flange 30 and tube 10 with a flange 31 which are encircled by a flanged ring 32, thus allowing the same movement as provided for extension 23.

A U-shaped brace 33 is secured to one side of tube 10 and is provided with a slot 34 through which a bolt 35 extends. A hinge member 36 has one leaf attached to brace 33 by means of bolt 35 and a support 37 is rigidly attached to its other leaf. A slide 38, having a slot 39 through which bolt 35 extends, overlaps hinge member 36 and is held in place by a wing nut 40 threaded onto bolt 35. Support 37 is adapted to be secured to the body of a motor vehicle and, by loosening nut 40, the entire device may be moved inwardly or outwardly within the limits of slot 34 in order to bring mirror 20 directly in front of the driver.

When the obstruction ahead of the vehicle is such that a view may not be had from the side, the entire device may be pivoted on bolt 35 in order to elevate extension 23. In order that a view of the road behind the car may be obtained, we provide a mirror 41 preferably secured to the rear side of extension 23 and with its surface disposed approximately parallel to the center line of tubes 10 and 11. Extension 23 is also provided with an electric lamp 42, having a reflector 42ª at the rear thereof, which is furnished with electric current through a cable 43 connected into the lighting circuit of the vehicle.

With this arrangement, the device combines the functions of a periscope, rear view mirror and spotlight.

The device is preferably mounted on the vehicle so as to be above the driver's normal line of vision, with extension 19 swiveled on tube 10 so that he can see into mirror 20 and with the device extending horizontally from the side of the vehicle. The opening of extension 23 is directly forwardly so that the driver may glance upwardly in the mirror 20 and see there the objects reflected by mirror 24 while the device itself will in no way obstruct his vision. When it is desired to view the road ahead of a wide bodied vehicle, gear 14 is actuated to extend tube 11 and extension 23 outwardly which will allow the driver to see ahead of such vehicle without leaving the right hand side of the road. When the obstruction is such that a view may not be had by extending the device horizontally, nut 40 is loosened and the instrument swung upwardly and extended. By withdrawing slide 38 from off one leaf of hinge member 36, the instrument may be swung from side to side.

In addition to using the device as a periscope and rear view mirror, as above described, lamp 42 may be illuminated and its rays directed at any angle that is possible with an ordinary spotlight with the added advantage of the operator being able to elevate the light by swinging the device on bolt 35. The light may then be swung from side to side by drawing slide 38 from off one leaf of hinge member 36 and allowing the entire device to swing on support 37 as described above.

With the device in a horizontal position, slide 38 may be withdrawn and the device swung slightly on hinge member 36, thus allowing the driver to view the territory immediately behind the car in mirror 40, which advantage has not been obtainable heretofore. By swiveling extension 23 on tube 11 and swinging the device slightly on hinge member 36, rays from lamp 42 may be directed immediately behind the vehicle for the purpose of illuminating the ground when it is desired to back the vehicle over unknown ground.

Referring now to Figure 7, tube 11 has a rack 12 secured thereon and covered by a housing 13ª, forming part of tube 10, and shaft 18ª is mounted in bearings 15 in the same manner as shown in Figures 1 to 4. A segmental gear 44 is fixed on shaft 18ª and meshes with rack 12. A bell crank 45 is fixed to shaft 18ª and yieldingly held in the position shown by a spring 46 having one end secured to one arm of bell crank 45 and its other end to the top of housing 13ª.

Segmental gear 44 is actuated by a wire or cable 47 secured to the end of the other arm of bell crank 45 and adapted to be led to a convenient location through a casing 48. It is evident that pulling on wire 47 will rotate gear 44 and extend tube 11 relatively to tube 10. Tube 11 is held in extended position by a pawl 49, which is journaled in bearings 50 mounted on tube 10, extending through an opening 51 in housing 13ª and held in engagement with the teeth on rack 12 by a spring 52. When it is desired to draw tube 11 inwardly, spring 52 is compressed and pawl 49 disengaged from rack 12. Spring 46 will then actuate bell crank 45 and rotate gear 44.

The construction hereinbefore set forth as illustrative of the invention may be variously changed within the scope and spirit of the invention as hereinbefore set forth and hereinafter claimed.

We claim:

1. In an observation device having a tube, means for mounting the device including a support, a hinge member secured to the support, a slide abutting the hinge member and having a slot, a brace secured to the tube and having a slot, and a bolt extending through the slot in the brace, the hinge member, and the slot in the slide.

2. A device of the class described including a telescoping tube, means for lengthening and shortening the tube, an extension rotatably mounted on the end of the tube, a mirror mounted in the extension at an angle to the tube, an electric lamp mounted in the extension, a brace secured to the tube and having a slot, a swingable bracket, and a bolt in the slot for securing the bracket to the brace.

3. A device of the class described including a telescoping tube, means for lengthening and shortening the tube, a mirror mounted at each end of the tube and disposed at an angle to the longitudinal centerline of said tube, a support, a universal joint connecting the tube and support, and means for clamping the universal joint in selected positions.

4. A device of the class described including a telescoping tube, means for lengthening and shortening the tube, a mirror mounted at each end of the tube and disposed at an angle to the longitudinal centerline of said tube, a universal joint mounted on the tube, means for clamping the universal joint in selected positions, and a support for said joint.

5. A device of the class described including a telescoping tube, means for lengthening and shortening the tube, a mirror mounted at each end of the tube and disposed at an angle to the longitudinal centerline of said tube, a hinge member pivotally mounted on the tube, means for clamping the tube in selected positions relatively to the hinge member, a support secured to the hinge member whereby the tube may be swung at an angle relatively to the support, and a slide engaging the clamping means and adapted to overlap the hinge member and prevent same from swinging.

6. A device of the class described including a telescoping tube, a flange on each end of the tube, a flanged collar encircling each flange, an extension at each end of the tube, a flange on each extension engaged by the collar, a mirror mounted in each extension at an angle to the centerline of the tube, and means to lengthen and shorten the tube.

7. A device of the class described including an outer tube, a gear mounted on the outer tube, a flange on one end of the tube, an inner tube telescoping into the outer tube, a rack mounted on the inner tube and meshing with the gear, a flange on the outer end of the inner tube, a flanged collar encircling each flange, an extension adjacent each collar, a flange on each extension encircled by the adjacent collar, a mirror mounted in each extension at an angle to the centerline of the tubes, means for actuating the gear, and means for pivotally and swingably mounting the device.

8. In combination with an observation device and a support, said observation device comprising a periscopic tube having mirrors at its ends positioned to reflect one upon the other, means for supporting the tube for universal adjustment, the means including a hinge member having leaves pivotally connected, one of which leaves is connected with the tube, and the other connected to a support and a plate slidable to position transversely of the pivotal connection between the plates.

9. A device of the class described including an outer tube, a gear mounted on the outer tube, an extension on one end of the tube, an inner tube telescoping into the other end of the outer tube, an extension on the outer end of the inner tube, said tubes and extensions being provided with annular flanges, channeled collars revolubly connecting said flanges, mirrors mounted in the extensions at an angle to the centerline of the tubes, a rack on the inner tube meshing with the gear, a housing formed on the outer tube for enclosing the rack, and means for actuating the gear.

10. A device of the character described including a telescoping tube, an extension on each end thereof, said tube and extensions being provided with abutting annular flanges, a channeled collar forming a revoluble connection of the flanges, a light deflector mounted in each extension at an angle to the tube, a support for securing the device to an object, and means connecting the device and the support so arranged that the device may be rotated on the support and swung in a plane at right angles to its plane of rotation.

11. A device of the class described including a telescoping tube, an extension on each end thereof, said tube and extensions being provided with abutting annular flanges, a channeled collar forming a revoluble connection of the flanges, a light deflector mounted in each extension at an angle to the tube, a support for securing the device to an object, and means connecting the device and the support so arranged that the device may be rotated on the support, swung in a plane at right angles to its plane of rotation, or moved longitudinally relatively to the support.

In testimony whereof we have signed our names to this specification.

JAMES J. CHARDELL.
LOUIS J. FERDINAND.